United States Patent
Sinha

(10) Patent No.: US 6,721,945 B1
(45) Date of Patent: Apr. 13, 2004

(54) OPTIMIZATION OF CALLS IN PROGRAMMING LANGUAGES USING POINTERS FOR PASSING REFERENCE PARAMETERS

(75) Inventor: Navin Sinha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 09/664,503

(22) Filed: Sep. 18, 2000

(51) Int. Cl.[7] .................................................. G06F 9/45
(52) U.S. Cl. ...................................................... 717/157
(58) Field of Search ......................................... 717/157

(56) References Cited

U.S. PATENT DOCUMENTS

| | | | | |
|---|---|---|---|---|
| 5,220,669 A | * | 6/1993 | Baum et al. ................ | 709/108 |
| 5,522,072 A | * | 5/1996 | De Bruler ................... | 712/220 |
| 5,530,870 A | * | 6/1996 | De Bruler ................... | 717/155 |
| 6,141,697 A | * | 10/2000 | Hale et al. .................. | 709/312 |
| 6,446,137 B1 | * | 9/2002 | Vasudevan et al. ......... | 709/330 |
| 6,481,007 B1 | * | 11/2002 | Iyer et al. ................... | 717/151 |
| 6,546,433 B1 | * | 4/2003 | Matheson ................... | 709/318 |

OTHER PUBLICATIONS

"Putting Pointer Analysis to Work", R. Ghiya et al, ACM, published 1998, pp. 121–133.*

"Using Registers to Optimize Cross–Domain Call Performance", Paul A. Karger, ACM published 1989, pp. 194–204.*

"Eliminating Redundancies in Sum–of–Product Array Computations", S. Deitz et al, ACM, 2001, pp. 65–77.*

"An Improved Storage Management Scheme for Block Structure Language", T.P. Murtaugh, ACM, 1991, pp. 372–398.*

Minimizing Register Usage Penalty at Procedure Calls, Fred C. Chow, ACM, 1988, pp. 85–94.*

"Advanced Compiler Design & Implementation", Steven S. Muchnick, published 1997, pp. 116–126,325–333.*

"Replacing Function Parameters By Global Variables", Peter Sestoft, ACM PRess, pp. 39–53, 1990.*

"Interprocedural Constant Propogation", D. Callahan et al, ACM Press, pp. 152–161, 1986.*

"The Functional Power of Parameter Passage Mechanism", A. Cricher , ACM Press, pp. 158–168, 1979.*

"Compilers, Tools and Teachniques", Aho et al, Chapters 1 and 7–8, Sep. 1985.*

Brian W. Kernighan and Dennis M. Ritchie, The C Programming Language, 2nd Ed. 1998, chapters 1–7.

* cited by examiner

*Primary Examiner*—Todd Ingberg
(74) *Attorney, Agent, or Firm*—T. Rao Coca; Anthony V. S. England; Manny W. Schecter

(57) ABSTRACT

A method and computer program product for executing procedure calls, such as procedure calls in the C programing language. For a procedure call, reference parameters are identified, and replaced by respective scalar variables. The scalar values are propagated to a call site and directly accessible by the calling procedure body. As such, the scalar variables are global in scope.

8 Claims, 4 Drawing Sheets

OPTIMIZATION OF CALLS IN PROGRAMMING LANGUAGES USING POINTERS FOR PASSING REFERENCE PARAMETERS

FIELD OF THE INVENTION

This invention relates to the programing languages that use pointers for passing reference parameters, and particularly the calling conventions of that language.

In this specification a reference to the "C programing language" or simply "C" is to be understood as a general reference to all C programing language versions, including ANSI C, C+ and C++. C is one such programing language that uses pointers for passing reference parameters.

It is further to be appreciated that the invention can be embodied at any desired programing level including source code, an intermediate language level, object code, or assembly-level code.

BACKGROUND OF THE INVENTION

A problem common to many high-level programing languages is the constraints placed upon programing semantics, which can hinder the generation of optimum source code. This is true of the calling conventions of the C programing language. A fundamental reference to the C programing language is the text "The C Programing Language", by Brian W. Kernighan and Dennis M. Ritchie, published by Prentice-Hall, second edition, 1998 (ISBN 0-13-110362-8). In C, there is a requirement that if any procedure makes changes to a formal parameter it should be passed as a reference parameter for this change to be visible outside the procedure.

This requires that the procedure takes-in pointer values as parameters, and at the call-site, the actual argument is the address-taken value of the variable that is needed to be modified. This introduces several unnecessary memory load and store operations.

FIG. 1 is a schematic block diagram of the generalised compilation process. In the first module 10, an input source code program undergoes lexical analysis, such that the program is broken up into a stream of lexical tokens that are recognised by the programing language. The passing module 12 then takes these tokens and performs a syntax analysis of the program, catches any syntax errors, and translates the program to an intermediate language. The semantic analysis module 14 principally performs a type-checking analysis. In the next module 16, various compiler optimizations are performed. The subsequent processing modules 18–22 perform register allocation and code generation (i.e. translation to assembly-level language), and production of the object code.

FIG. 2 is a schematic flow diagram demonstrating how parameters are passed in such conventional compilers. The call site is that passing the reference parameter, while the procedure body is that element using or defining the reference parameter. At the call-site, in step 30, the actual argument value is placed into memory. In step 32, the address of this location is placed in the parameter register. On the procedure body side, the memory address value for the argument value is fetched from the parameter register, in block 34. Finally, in step 36, the argument value is read from/assigned to the memory location.

Consider now the specific example of swapping two variables, A and B, represented by the following source code:

```
void swap(int* x, int* y)
{
    int temp = *x;
                        *x = *y;
    *y = temp;
}
```

The call-site that wants to swap the two variables A and B would call the foregoing procedure as:

swap(&a, &b);

A sample of the assembly-level code generated by the procedure is follows:

1 r0, 0 (r4)
1 r5, 0 (r3)
st r0, 0 (r3)
st r5, 0 (r4)
...

Here, the registers r3 and r4 store the addresses of the locations containing the values to be swapped. These memory locations are dereferenced, and the values stored in registers r5 and r0 respectively, then these values are written back into the swapped locations. The sequence of the code at the call-site contains instructions for storing the values of a and b to memory and storing the values of the corresponding memory locations into registers r3 and r4. Since the addresses of these variables have been taken, they should be located in proper memory locations. However in this particular case, the call-site takes the address of these variables, not because this address-value is to be used, but because this is the only mechanism to allow the procedure swap to interchange two values and have them visible outside the procedure.

If the registers r3 and r4 are permitted to hold the actual values to be swapped, dereference of the address contained in these registers would not be required; moreover, storing of the values of the variables a and b into memory locations and then storing those locations into registers would not be required. Rather, it would simply be a matter of loading the values a and b into registers r3 and r4, calling the function swap, and picking up the swapped values from registers r4 and r3 respectively.

The present invention is directed to achieving this result.

SUMMARY OF THE INVENTION

The gist of the invention is the replacement of reference parameters by scalar variables that are visible to the calling procedure, such as being global in scope.

The invention discloses a method for executing procedure calls, the method comprising the steps of:

replacing reference parameters for a calling procedure by variables visible to the calling procedure; and directly accessing the argument value by the calling procedure body.

The invention further discloses a method for executing procedure calls, the method comprising the steps of:

identifying reference parameters for a calling procedure;

replacing said reference parameters with respective scalar variables;

propagating said scalar variables at a call site; and directly accessing the scalar variables by the calling procedure body.

In a preferred form, the step of identifying reference parameters includes those parameters which are dereferences in a procedure body until the first calling definition. The propagating step can include backwards copying said scalar variables. The propagating step can further include forwards copying said scalar values. It is particularly preferred that the procedure calls relate to the C programing language.

The invention yet further discloses a method for optimizing a compiler for the C programming language, comprising the steps of:

translating a C language code body to an intermediate language code body;

for procedure calls, replacing reference parameters thereof by variables visible to a call procedure; and translating said intermediate language code body, with said replacement variables, to an assembly language code body.

The invention yet further discloses a computer program product having a computer readable medium with a computer product recorded thereon for executing procedure calls. The computer program includes respective computer program code means for performing the steps defined above.

The replacing step can include identifying reference parameters for a calling procedure, replacing said reference parameters with respective scalar variables, and propagating said scalar variables at a call site. Not all reference parameters are replaced with respective scalar variables; non-replace parameters being propagated at a call-site.

BRIEF DESCRIPTION OF THE DRAWINGS

Embodiments of the invention will be described with reference to the accompanying drawings, in which.

DESCRIPTION OF PREFERRED EMBODIMENTS AND BEST MODE

Overview

Figure 3:
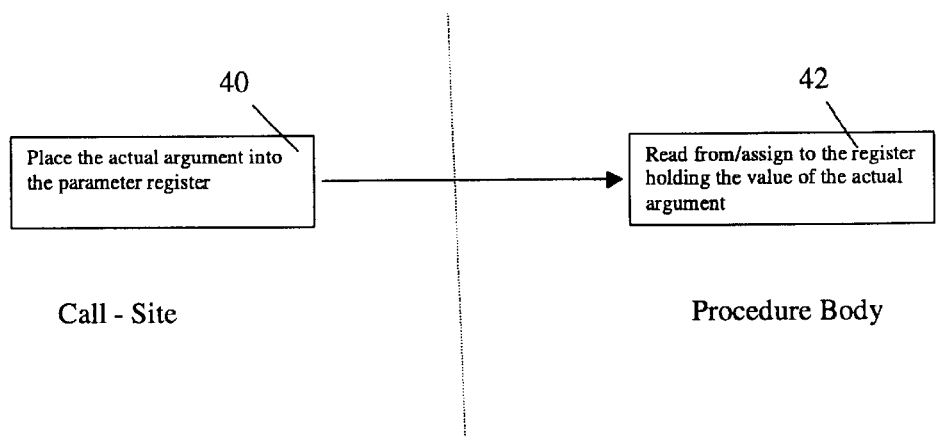
FIG. 3 is a schematic flow diagram of a conceptual variable swap procedure in accordance with the invention.

FIG. 3 represents the desired method of passing reference parameters in accordance with the invention. At the call site, the actual argument is placed into the parameter register (step 40). The procedure body then directly reads from/ assigns the actual argument value from the register (step 42).

Figure 4:
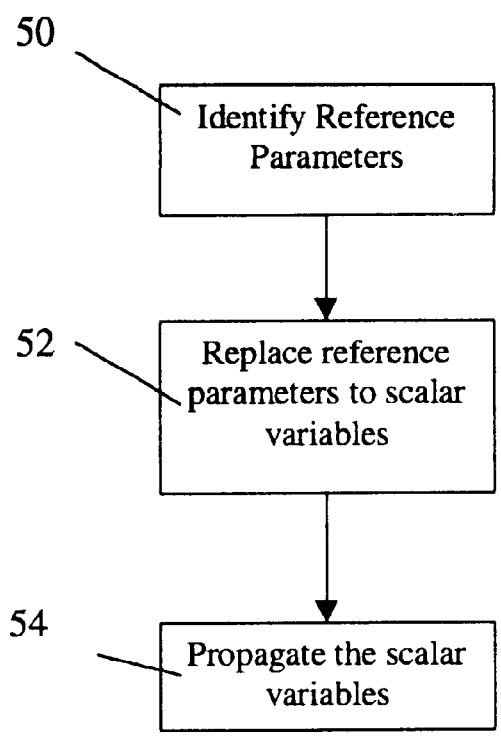
FIG. 4 is a schematic flow diagram of the handling of reference parameters in accordance with the invention.

Referring now to FIG. 4, the basic steps according to the invention are shown. In step 50, the reference parameters to be passed are identified. Those parameters which are of type "pointers", and all its uses up to the point of its first definition in the procedure, are identified as reference parameters. Once identified, the reference parameters are replaced by scalar variables in step 52, meaning that all the code sequences involved with dereferencing of the reference parameters have to be replaced by a simple load/store of the new scalar variables. The code sequences involved with taking the address of a variable and passing it as the actual argument are replaced by the simple loads of the variable. Finally, in step 54, the scalar variables propagated at the call-site, in the backward directions, to assign the value of the arguments to the scalar variables directly. The values can also be propagated in the forward direction, enabling the values modified by the called procedure in the calling procedure directly. This procedure can be applied to source code, intermediate code, or even at the assembly-level code.

By way of example, the methodology expressed above is embodied as:

1. A pointer formal parameter "p" is identified to a procedure as a reference parameter. It is a candidate if the pointer value of such a pointer is used in the procedure only as dererefences.

2. The formal parameter "p" is replaced by another variable "v" of the pointee type. All instances of the dereference of the formal parameter *p are replaced by the new variable "v". The scope of this variable is expanded to enable it to receive values from call-sites and be able to propagate the side-effects of the procedure body directly into the calling procedure.

3. Backward copy propagation at the procedure call-site is performed to enable the new variable to obtain its incoming value directly from the call-site.

4. Forward copy propagation is provided at the procedure call-site to propagate the side-effects of the called procedure into the calling procedure.

Generally, the invention can be applied to calls made to procedures which use arguments of pointer-type for passing reference parameters.

First Embodiment

In what follows, the embodiment of a procedure for swapping two variables (i.e. swap) will be used.

Referring then to items 1–4 described above, the following methodology is performed:

1. By an analysis of the procedure body of the procedure swap, it is apparent that the formal parameters x and y are candidates for this optimization to be applied, since these pointer values are only dereferenced within the procedure.

1. Replace x and y by new formal parameters X and Y of type int and replacing all occurrences of *x by X and *y by Y in the procedure body.

```
swap( int X, int Y)
{
    int temp = X;
    X = Y;
        Y = temp;
}
```

The next step is to expand the variables X and Y from being formal parameters to global variables. The principle thus is to make these variables available at (i.e. visible to) the call-site.

Now, the procedure body is:

```
swap( )
{
    int temp = X;
    X = Y;
        Y = temp;
}
``` with the variables X and Y no longer being formal parameters but global variables.

Assume that the call-site has the following statements:

scanf ("%d %d",&a, &b);

swap (&a, &b);

printf ("%d %d",a, b);

Prior to the statement swap (&a, &b), statements X=a; Y=b; are added so that the variables X and Y are initialized properly before entering the procedure swap;

scanf("%d %d",&a, &b);

X=a;

Y=b;

swap( );

printf("%d %d",a, b);

1. The statements X=a and Y=b are backward copy propagated to get:

scanf("%d %d", &X, &Y);

1. Forward copy propagate these statements to get:

printf("%d %d",X, Y);

So now, the modified call-site is:

scanf("%d %d",&X, &Y);

swap( );

printf("%d %d",X, Y);

Had this methodology been applied to the assembly code, the code would become:

swap :

1 r0, r3

1 r5, r4 st r0, r4 st r5, r3

..

At the call-site, the code for storing values of a and b into memory locations would be eliminated; moreover r3 and r4 would be loaded by the values a and b themselves.

Identifying Pointers that are Potential candidates for Optimization

This can be achieved by analyzing the procedure body for the occurrences of a formal parameter of pointer type. If all occurrences of a given formal parameter within a procedure body till the point of the first killing definition of the formal parameter, are in the form of dereferences, then it becomes a potential candidate for this transformation; e.g a procedure may take in a parameter int* p and the procedure body may contain P=malloc (..).

Only the occurrences of 'p' before this statement have to be considered.

Consider the following examples which illustrate the determination of whether a variable is a "reference parameter":

(a) The variable 'a' is not a reference parameter, since the value of 'a' is used directly

```
void foo(int *a, ... )
{
*a=...
   = *a
printf("%ld\n", a) ;
}
```

(b) The variable 'a' is a reference parameter, since 'a' is used only as dereferences

```
void foo(int *a, ... )
{
*a= . . .
   = *a
}
```

(c) The variable 'a' is a reference parameter, since 'a' is used only as dereferences before its redefinition

```
void foo(int *a, ... )
{
*a= . . .
   = *a
a= malloc( . . . )
}
```

This analysis can equally be applied to the assembly-level code, by identifying registers with upward exposed use in the procedure, which are only dereferenced within the procedure. Such registers will be the potential candidates for this transformation.

Creating a New Procedure Body

This can be applied at the assembly code level, where the register that was used to hold the memory-address is replaced with another (or maybe same) register and used to hold the scalar values instead.

Backward Copy Propagation of Input Parameters

"Backward copy propagation" is the same as the conventional copy-propagation, with the difference that it is performed in the backwards direction. For example, given the piece of code containing two statements scanf ("%d",&x);

y=x

In case of backward copy propagation the first statement is rewritten as:

scanf ("%d", &y);

The backward copy propagation is applied in the following manner:

At the call-site, for each actual argument of the type "var", the reaching definition of var is found. If this statement is of the type:

var=&another_var;

This statement is replaced by

X=another_var and replace all uses of this reaching definition till the call-site.

If the reaching definition is a copy statement var=another_var the search backwards is continued, now searching for the reaching definitions of another_var.

If the reaching definition is any other statement (e.g. assigning to the return value of a malloc), this transformation is not applicable at this call-site.

At the call-site, for each actual argument of the type &var, assuming that the global variable corresponding to this formal parameter introduced by step 2 is X, the statement X=var is added immediately preceding the call-site.

The call statement is replaced by the call to the cloned procedure body created by step 2.

These steps can be implemented in the assembly code by backward propagating the register that holds incoming values to the procedure. This will eliminate redundant loads to memory that are introduced because of the address of variables being taken.

Forward Copy Propagation of Output Parameters

If the steps described in point 4 above are successful in transforming the call-site, then for each reference parameter p of the calling procedure, if the corresponding "promoted" variable is X, all uses of the variable whose address was passed are replaced as the actual argument for this parameter by X; till a killing definition for that variable is encountered, or till another statement that takes the address of this variable is encountered.

As a further example, consider two functions f1 and f2 that take-in reference parameters and modify their values:

```
void assign_1(int* p)
{
    *p = 1;
}
void assign_2(int *p)
{
    *p = 2;
}
```

Assume that clones of these procedures have been created as:

```
Void assign_1_clone( )
{
    X = 1;
}
void assign_2_clone( )
{
    Y = 2;
}
```

Assume the main program is as follows:

```
main( )
{
    int a;
    scanf("%d", &a);
    assign_1(&a);
    assign_2(&a);
    printf("%d \n", a);
}
```

The transformed code would be:

```
main( )
{
    scanf("%d", &X);
    assign_1_clone( );
    Y = X;
    assign_2_clone( );
    printf("%d \n",Y);
}
```

If applied at the assembly level, if both assign_1 and assign_2 used the same register to accept the incoming parameter, the statement Y=X will not be required at all.

Specific Implementation

Figure 1:
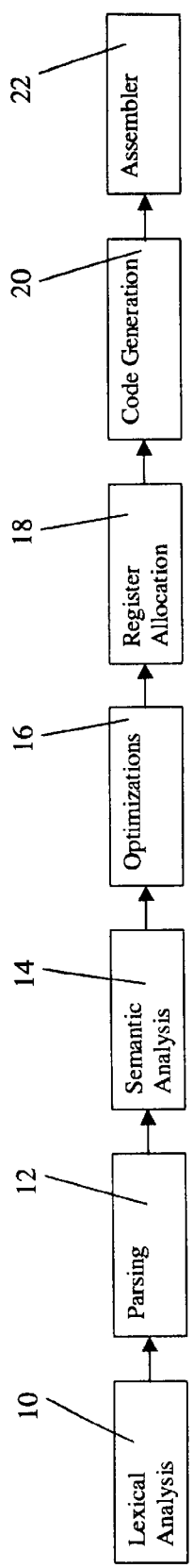
FIG. 1 is a schematic block diagram of a generalised known compilation process.
Figure 2:
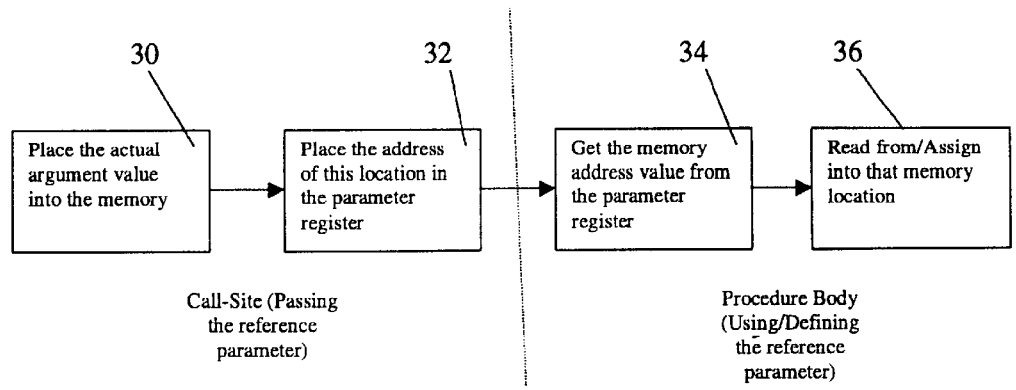
FIG. 2 is a schematic flow diagram that shows a typical known C reference passing procedure.

This foregoing methodology can conveniently be implemented at the intermediate code level, represented by the optimization module 16 in FIG. 1.

In the implementation, the call-graph for the program needs to be constructed. A call-graph is a directed multigraph. The nodes of this multigraph represent the procedures in the program, and the edges represent the procedure calls, (e.g. a directed edge (p1, p2) represents a procedure call from the procedure represented by node p1 to the procedure represented by node p2). Since one procedure can have multiple calls to another procedure, there can be more than one edge between two nodes of the call-graph. There can even be self-edges in case of recursive calls, and cyclic paths in presence of mutually recursive procedures.

The call-graph for the program can be traversed in any order. For each procedure, P, being traversed, the procedure's formal parameters and the procedure body are analyzed and a summary is obtained regarding what formal parameters have been identified as reference parameters (as described above). As before, new scalar variables that may potentially replace these reference parameters are created. From the call-graph, all the call-sites for the procedure P are obtained. For each call-site (CS), the scalar variables are propagated backward to verify, whether at this call-site, it is possible to pass a scalar variable as parameter instead of passing the memory address of it (e.g. if the call-site (CS) takes the address of a variable, v, and passes &v, as the actual argument, we can replace the procedure P's reference parameter by a scalar variable and pass 'v' as the actual argument instead of '&v'). However, if the call-site (CS) allocates memory using malloc, and then passes that memory address as the actual argument then this actual argument cannot be replaced by an scalar variable.

Once all the call-sites for procedure P that allow this replacement of the pointer arguments with scalar arguments has been verified, it is concluded that the technique is applicable for procedure P.

The next step is to create a new procedure body P', which is the transformed version of the procedure P. all the occurrences of the reference formal parameters of this variable in the procedure body are visited. By the definition of the reference formal parameters, all these occurrences, till the first assignment to the formal parameter, are in the form of dereferences. Suppose the new scalar variable X for a reference parameter p is crated, all occurrences of *p in the procedure P are replaced, till the point of the first definition of 'p' by the new scalar variable X. The scope of X is made global so that the argument value to it can be assigned directly at the call-site and program statements after the call-site. This is done for all the reference formal parameters that the procedure P takes.

Having created the new procedure body P', if the procedure P' does not contain any more occurrence of the variable 'p' (i.e. all the occurrences of the variable 'p' in the original procedure body P were only in the form of '*p'), 'p' is deleted from the formal parameters list of the procedure P'. This completes the transformation of the procedure body P.

Next, the call-site is modified by propagating the newly created scalar variables. Firstly, the scalar variable backwards at the call-site in order to allow these variables to obtain their values at the call-site. Next, the scalar variables are propagated forwards in the calling procedure, so that the changes made by the called procedure P are reflected in the statements following the call-site.

In order to propagate the scalar variable backward, the actual arguments at this call-site, corresponding to the reference formal parameters for the procedure P, are examined.

In the test for validity of the optimization, it has been ensured that the address being passed is obtained by taking the address of a memory location, and not by malloc-kind of statements. For each actual argument, A, corresponding to a reference formal parameter, p, the statement where the address-taken value is obtained is located. Suppose the actual argument A holds the address of the scalar variable 'v'. Then, an assignment statement before the call-site that assigns the variable 'v' to the global scalar variable introduced to replace the reference parameter 'p' is introduced. This step requires def-use analysis and copy-propagation.

In the final step of applying this technique, the global scalar variables are forward-propagated at the call-site so that the modifications made to any of the reference parameters in the original called procedure, which has now been replaced by modifications to these global scalar variables, are reflected in the calling procedure after the call-site. For this purpose, a def-use analysis is performed in the calling procedure to locate all the occurrences of the values, whose addresses were passed as actual arguments. More specifically, if '&v' was an actual argument for the call to the procedure P, and X was the global scalar variable that replaced this actual argument, all uses of 'v' after the call-site till the point of its first definition is replaced by X.

In another form of the invention, the replacement of pointer arguments with scalar arguments can occur for even a single call-site. In such cases, the call-sites where the replacement is allowed will be modified with the new procedure body P. On the other hand, the call-sites that do not allow this modification continue to call the original procedure body P.

Computer Implementation

Figure 5:
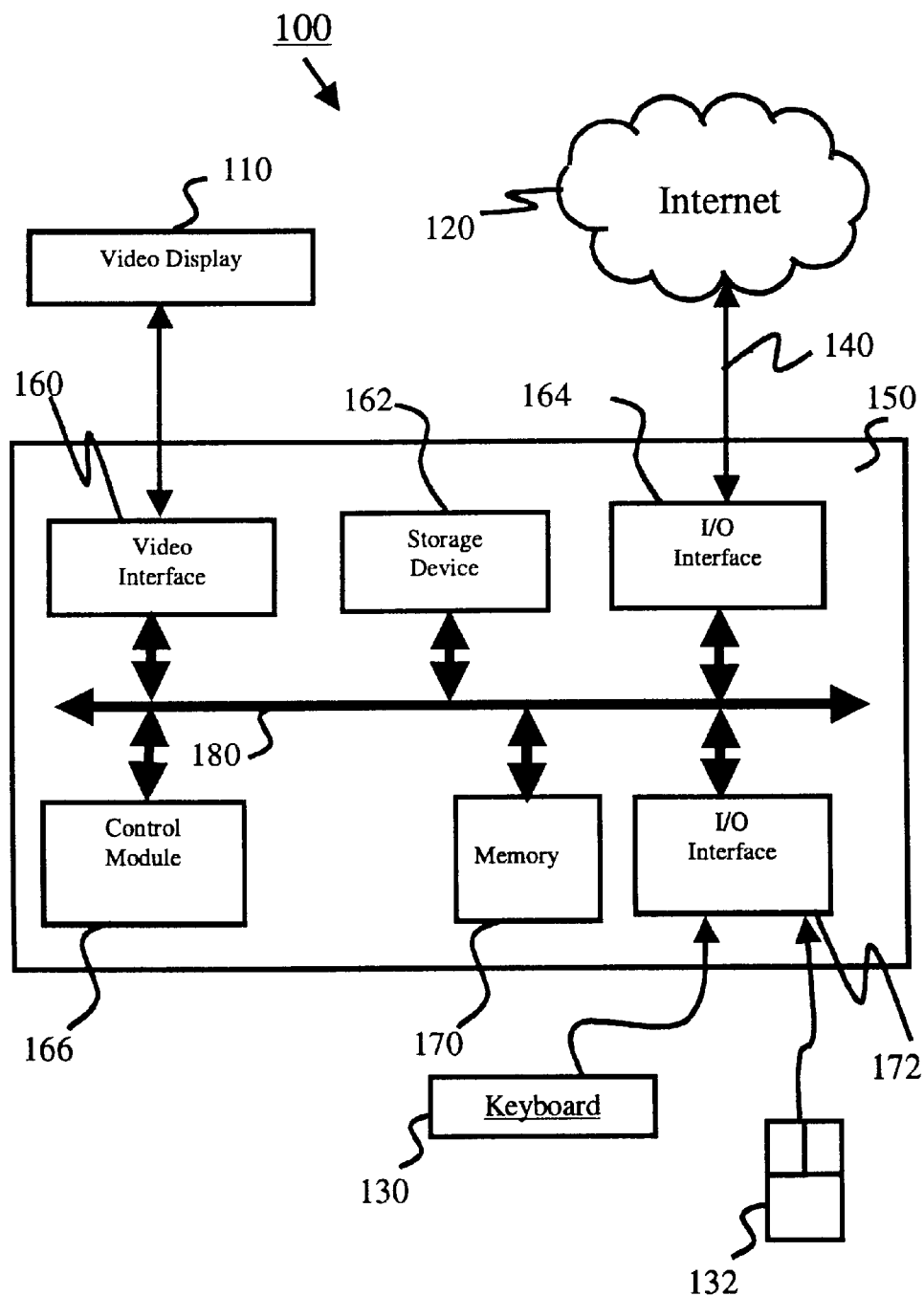
FIG. 5 is a schematic block diagram of a computing device upon which the invention may be practised.

The process for executing procedure calls can be implemented using a computer program product in conjunction with a computer system 100 as shown in FIG. 5. In particular, the executing procedure calls can be implemented as software, or computer readable program code, executing on the computer system 100.

The computer system 100 includes a computer 150, a video display 110, and input devices 130, 132. In addition, the computer system 100 can have any of a number of other output devices including line printers, laser printers, plotters, and other reproduction devices connected to the computer 150. The computer system 100 can be connected to one or more other computers via a communication input/output (I/O) interface 164 using an appropriate communication channel 140 such as a modem communications path, an electronic network, or the like. The network may include a local area network (LAN), a wide area network (WAN), an Intranet, and/or the Internet 120.

The computer 150 includes the control module 166, a memory 170 that may include random access memory (RAM) and read-only memory (ROM), input/output (I/O) interfaces 164, 172, a video interface 160, and one or more storage devices generally represented by the storage device 162. The control module 166 is implemented using a central processing unit (CPU) that executes or runs a computer readable program code that performs a particular function or related set of functions.

The video interface 160 is connected to the video display 110 and provides video signals from the computer 150 for display on the video display 110. User input to operate the computer 150 can be provided by one or more of the input devices 130, 132 via the I/O interface 172. For example, a user of the computer 150 can use a keyboard as I/O interface 130 and/or a pointing device such as a mouse as I/O interface 132. The keyboard and the mouse provide input to the computer 150. The storage device 162 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 150 is typically connected to other devices via a bus 180 that in turn can consist of data, address, and control buses.

The method steps for executing procedure calls are effected by instructions in the software that are carried out by the computer system 100. Again, the software may be implemented as one or more modules for implementing the method steps.

In particular, the software may be stored in a computer readable medium, including the storage device 162 or that is downloaded from a remote location via the interface 164 and communications channel 140 from the Internet 120 or another network location or site. The computer system 100 includes the computer readable medium having such software or program code recorded such that instructions of the software or the program code can be carried out. The use of the computer system 100 preferably effects advantageous apparatuses for constructing a runtime symbol table for a computer program in accordance with the embodiments of the invention.

The computer system 100 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 166. Intermediate storage of the program code and any data including entities, tickets, and the like may be accomplished using the memory 170, possibly in concert with the storage device 162.

In some instances, the program may be supplied to the user encoded on a CD-ROM or a floppy disk (both generally depicted by the storage device 162), or alternatively could be read by the user from the network via a modem device connected to the computer 150. Still further, the computer system 100 can load the software from other computer readable media. This may include magnetic tape, a ROM or integrated circuit, a magneto-optical disk, a radio or infrared transmission channel between the computer and another device, a computer readable card such as a PCMCIA card, and the Internet 120 and Intranets including email transmissions and information recorded on Internet sites and the like. The foregoing are merely examples of relevant computer readable media. Other computer readable media may be practised without departing from the scope and spirit of the invention.

The executing procedure calls can be realised in a centralised fashion in one computer system 100, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

The foregoing describes only one embodiment of the present invention, and modifications and/or changes can be made thereto without departing from the scope and spirit of the invention, the embodiment being illustrative and not restrictive.

I claim:

1. A method for executing procedure calls, the method comprising the steps of:

identifying a certain parameter as a reference parameter for a first procedure, wherein the first procedure receives the certain parameter from a call-site and the certain parameter is identified as a reference parameter if for a given definition of the parameter within a procedure body of the first procedure all occurrences of the parameter within that procedure body are in an indirect form;

replacing said occurrences of the reference parameter in the procedure body of the first procedure with a scalar variable, wherein such a scalar variable is referred to directly in the procedure body of the first procedure;

propagating said scalar variable in a procedure body of the call-site; and directly accessing the scalar variable.

2. The method of claim 1, wherein said propagating step includes backwards copying said scalar variable.

3. The method of claim 2, wherein said propagating step further includes forwards copying said scalar value.

4. The method of claim 3, wherein the first procedure relates to the C programming language.

5. A method for optimizing a compiler for the C programming language, comprising the steps of:

translating a C language code body to an intermediate language code body;

for procedure calls, replacing reference parameter thereof by variables visible to a call procedure; and translating said intermediate language code body, with said replacement variables, to an assembly language code body, wherein said replacing step includes:

identifying a certain parameter as a reference parameter for a first procedure, wherein the first procedure receives the certain parameter from a call-site and the certain parameter is identified as a reference parameter if for a given definition of the parameter within a procedure body of the first procedure all occurrences of the parameter within that procedure body are in an indirect form;

replacing said occurrences of the reference parameter in the procedure body of the first procedure with a scalar variable, wherein such a scalar variable is referred to directly in the procedure body of the first procedure; and propagating said scalar variable in a procedure body of the call-site.

6. A computer program product having a computer readable medium with a computer program recorded thereon for executing procedure calls, said computer program comprising:

computer program code means for identifying a certain parameter as a reference parameter for a first procedure, wherein the first procedure receives the certain parameter from a call-site and the certain parameter is identified as a reference parameter if for a given definition of the parameter within a procedure body of the first procedure all occurrences of the parameter within that procedure body are in an indirect form;

computer program code means for replacing said occurrences of the reference parameter in the procedure body of the first procedure with a scalar variable, wherein such a scalar variable is referred to directly in the procedure body of the first procedure;

computer program code means for propagating said scalar variable in a procedure body of the call-site; and computer program code means for directly accessing the scalar variable.

7. The computer program product of claim 6, wherein said computer program code means for propagating said scalar value includes computer program code means for backwards copying said scalar variables.

8. The computer program product of claim 7, wherein said computer program code means for propagating said scalar values includes computer program code means for forwards copying said scalar values.

* * * * *